C. C. PECK.
Amalgamator.

No. 46,492.

Patented Feb. 21, 1865.

Witnesses

Inventor
C. C. Peck

United States Patent Office.

C. C. PECK, OF BLACK HAWK, COLORADO TERRITORY.

IMPROVED AMALGAMATOR.

Specification forming part of Letters Patent No. 46,492, dated February 21, 1865.

*To all whom it may concern:*

Be it known that I, C. C. PECK, of Black Hawk, in the county of Gilpin and Territory of Colorado, have invented a new and Improved Apparatus for Amalgamating Ores; and I do hereby declare that the following is a full, clear, and exact description thereof, reference being had to the accompanying drawings, making part of this specification, and to the letters of reference marked thereon, in which—

Figure 1:
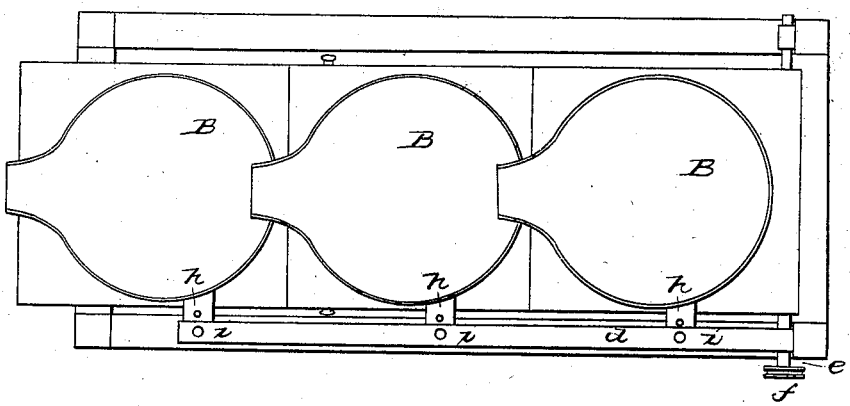
Figure 2:
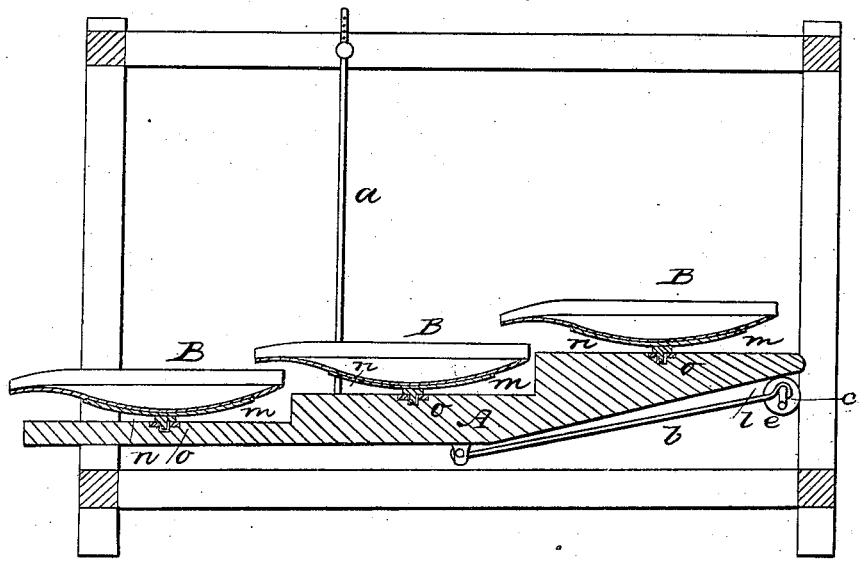

Figure 1 is a top plan view, and Fig. 2 is a longitudinal vertical section.

A represents a platform or frame, so constructed that the pans B, when placed thereon, shall form an inclined series, as shown in Fig. 2. This platform is suspended by the rods $a$, which are attached to it—one on each side—in such a position that nearly its entire weight shall be brought to bear upon the rods. A shaft, $e$, is placed transversely under the upper end of the platform A, and on this shaft is secured an eccentric or cam, $c$, upon which the upper end of the platform rests, as shown in Fig. 2. The shaft $e$ is also provided with a crank, $l$, to which is connected one end of the rod or pitman $b$, the opposite end being pivoted to the platform A, as shown in Fig. 2. A pulley, $f$, mounted on the shaft $e$, serves to communicate motion to the apparatus.

A spider or frame, $m$, of suitable shape, is constructed to receive and support the pans B. A hub or bearing, $n$, is secured to the spiders $m$, centrally underneath, and this bearing $n$ has a journal projecting downward therefrom and fitting loosely into a socket in the metal plate $o$, secured upon the platform A. Each of the spiders $m$ has an arm, $h$, projecting laterally therefrom, which arms are pivoted to one side of the frame or to the rod $d$, rigidly attached thereto, as shown in Fig. 1 at $i$.

Each of the pans B is constructed of copper, preferably, though other material may be used, and is provided with a spout, as shown. These pans are so located that the spout of each shall project over the pan next below it in the series.

The operation is as follows: The machine being suitably located to receive the crushed ore, together with a suitable supply of water, and a proper quantity of quicksilver being placed in the pans, motion is imparted to the apparatus in any suitable manner.

It will be observed that by the peculiar arrangement of the parts three motions are imparted to the pans B at one and the same time. While the eccentric $e$ gives to the platform an up-and-down movement, the crank $l$, through the medium of rod $b$, gives to it a longitudinal movement back and forth. At the same time the pans, being attached by the arms $h$ on one side, as described, have imparted to them by the longitudinal movement of platform A a to-and-fro rotary motion, these motions thus combined very nearly resembling the peculiar movements given to a pan when used by a skillful operator in the well-known hand process. By this means the particles of fine gold which are intermixed with the crushed quartz or other refuse matter is most thoroughly brought in contact with the quicksilver, with which it chemically unites, and is thereby extracted from the quartz and retained in the pan, while the refuse matter passes off with the water. By using a series of pans, as described, the gold which may by chance or otherwise pass out with the water and other material from the first or upper pan will be caught and retained in the second pan, where it is subjected to a repetition of the process already described, and thus all or a much larger proportion than usual of the gold is saved. Any number of pans may be used, but in practice I find three sufficient, little or no gold ever being found in the lower pan.

The apparatus is extremely simple, cheap, and efficient, and can be operated with a small expenditure of power.

Having thus described my invention, what I claim as new, and desire to secure by Letters Patent, is—

1. The pan B, constructed in the form and style shown and described.

2. A series of pans, arranged to operate in the manner and for the purpose set forth.

3. The spider $m$, provided with the bearing $n$ and arm $h$, substantially as shown and described.

4. The suspended platform A, arranged to vibrate vertically and longitudinally, as and for the purpose set forth.

5. So arranging an amalgamator-pan as to give to it the three-fold motion, substantially as and for the purpose set forth.

Witnesses:                 C. C. PECK.
W. C. DODGE,
E. N. DRURY.